United States Patent [19]

Papst

[11] 4,129,796
[45] Dec. 12, 1978

[54] STATOR WINDING MOUNTING FOR AN ELECTRIC MOTOR

[75] Inventor: Georg Papst, St. Georgen, Fed. Rep. of Germany

[73] Assignee: Papst-Motoren KG, St. Georgen, Fed. Rep. of Germany

[21] Appl. No.: 640,170

[22] Filed: Dec. 12, 1975

[30] Foreign Application Priority Data

Dec. 13, 1974 [LU] Luxembourg ............... 71477

[51] Int. Cl.² ............................................. H02K 1/04
[52] U.S. Cl. ................................. 310/43; 310/67 R; 310/91; 310/260
[58] Field of Search .................. 310/43, 85, 67, 91, 310/90, 260, 42

[56] References Cited

U.S. PATENT DOCUMENTS

| 2,926,838 | 3/1960 | Van Rijn | 310/67 |
|---|---|---|---|
| 3,436,569 | 4/1969 | Flaherty | 310/43 |
| 3,726,575 | 4/1973 | Moorman | 310/90 |
| 3,772,544 | 11/1973 | Wrobel | 310/67 |
| 3,777,191 | 12/1973 | Papst | 310/67 |
| 3,786,290 | 1/1974 | Papst | 310/67 |
| 3,814,960 | 6/1974 | Burgbacher | 310/67 |
| 3,961,864 | 6/1976 | Papst | 310/91 |

Primary Examiner—R. Skudy
Attorney, Agent, or Firm—Craig & Antonelli

[57] ABSTRACT

The invention relates to an electric motor whose rear stator winding ends are embedded in a casting of electrically insulating plastic which is hard at the operating temperature of the motor, which is mounted with a stable metal flanged plate coaxial to the motor axis and fixed to a metallic outer casing member, wherein the flanged plate for the rear winding ends is perforated and is embedded in the casting up to its flange outer edge connected with the casing member at the axial height of the winding ends, surrounding the latter with an insulating clearance, the flanged plate serving too as a heat transfer means.

A particular application of the invention is to built-in fans.

14 Claims, 8 Drawing Figures

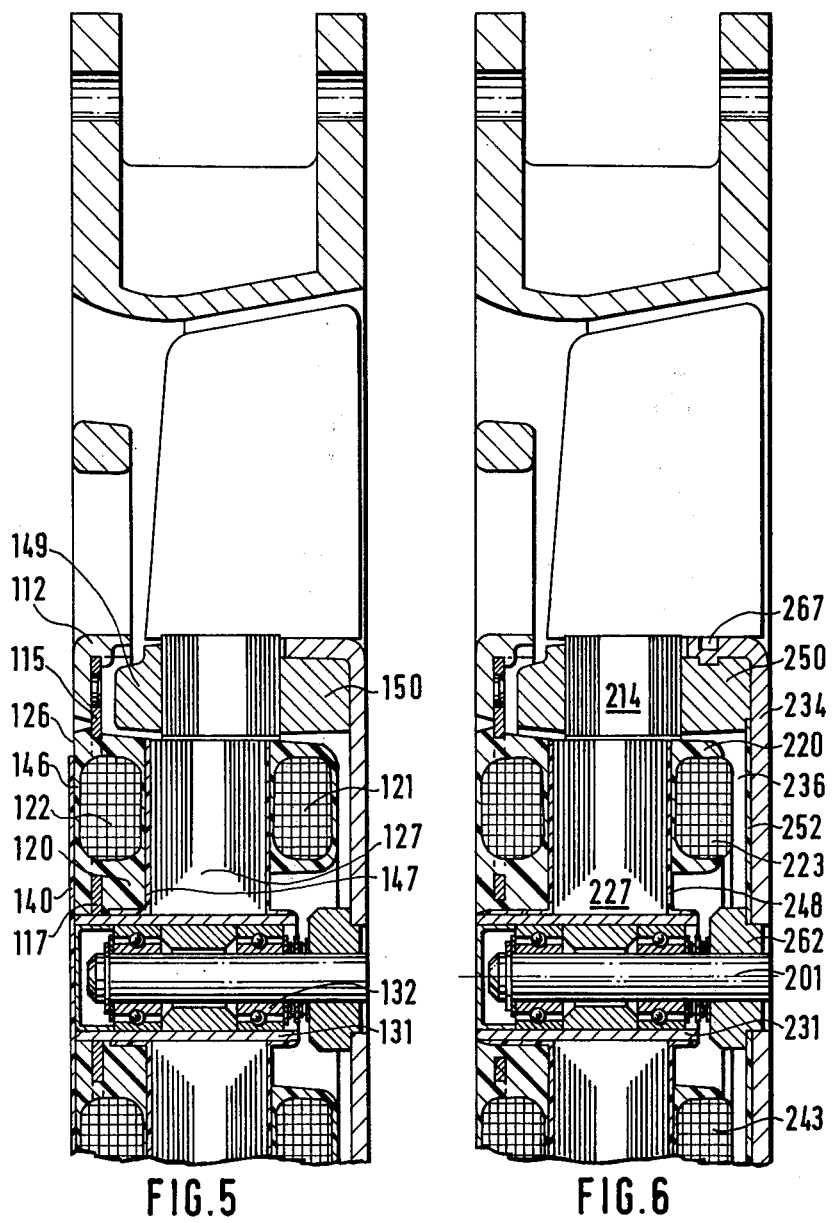

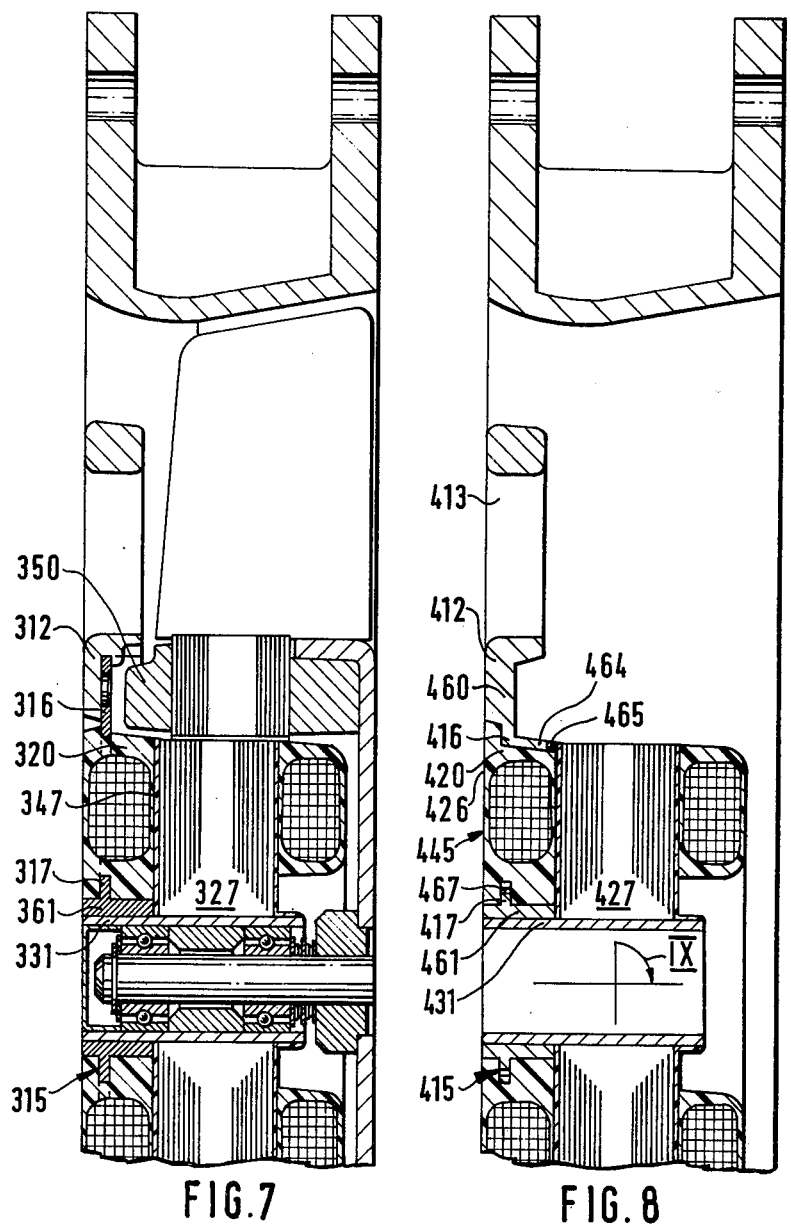

STATOR WINDING MOUNTING FOR AN ELECTRIC MOTOR

BACKGROUND OF THE INVENTION

The present invention relates to an electric motor whose rear stator winding ends are embedded in a casting of electrically insulating plastic which is hard at the operating temperature of the motor, which is mounted with a stable metal flanged plate coaxial to the motor axis and fixed to a metallic outer casing member.

In a known motor the casting covers the rotor from the rear and is in turn backed over its entire rear portion by a flanged plate which forms the rear wall of the motor.

Due to the embedding of the winding in plastic, it is supported and simultaneously supports the motor, whereby protection is also given from external damage particularly during assembly. As the casting compound surrounds the winding ends in insulating manner the overall electrical insulation calls for smaller insulating clearances between the winding ends on the one hand and the metal parts placed around the same on the other.

BRIEF SUMMARY OF THE INVENTION

The problem of the invention is to make a motor of the type indicated hereinbefore as axially compact as possible whilst in particular adhering to more stringent insulating requirements.

According to the invention the flanged plate for the rear winding ends is perforated and is embedded in the casting up to its flange outer edge connected with the casing member at the axial height of the winding ends, surrounding the latter with an insulating clearance.

The invention makes it possible to economise at least the additional axial overall height necessary for the flanged plate of the known motor. Furthermore, as the flanged plate projects into the casting until in close proximity with the winding ends over the complete periphery, if offers an additional heat transfer for the heat due to energy losses produced in the winding ends.

The flange outer edge can be fixed to the casing member by riveting, welding, joining by casting, contact pressure or the like, it being essential that the fixing method ensures a good heat conducting metal contact. The flanged plate can also be a single stamped or cast part with the outer casing member. The outer casing member is preferably made from aluminium whereby the flanged plate is also then preferably made from aluminium or some other light metal or light metal alloy.

It is the problem of a further development to improve the hold of the flanged plate and consequently the possible dissipation of heat. This problem is solved in that in the case of concentrated stator poles the flanged plate comprises two coaxial rings into whose radial gap projects the rear winding ends with an insulating clearance, the said rings being interconnected by spokes located in front of the slots.

The inner ring which enlarges the flanged plate and consequently improves its hold additionally dissipates heat from the inside of the winding ends and this heat can then migrate radially further outwards via the spokes. This further development utilises the free gaps existing between the winding ends of motors with concentrated stator poles for the arrangements of spokes.

The dissipation of heat can be further improved in that with good metallic contact the flanged plate is mounted on a metallic bearing tube located on the rotor shaft bearing. Due to the metallic contact existing between the flanged plate and the bearing tube in this further development an even more favorable path for the dissipation of heat from the center of the motor is provided at this point, and in addition the bearing tube is electrically connected with the remaining parts of the casing by the flanged plate which is advantageous from the insulation standpoint because the metallic outer casing is generally earthed (protective conductor to earth potential). As a result heat is also passed to the outside from the stator.

The heat conducting contact between flanged plate and bearing tube can be still further improved by the flanged plate having a metallic sleeve located on the bearing tube. As a result of such a sleeve which can be formed by a thickening of the flanged plate edge, the flanged plate can be simply and precisely radially fixed on the bearing tube for the casting process for producing the casting. A flanged plate provided with a sleeve can be axially easily fixed for the casting process by making the sleeve so long that when the flanged plate is in the fitted position it engages on the stator plates.

By corresponding constructional shaping of the flanged plate the latter can also be used as a mould for casting the casting.

With a view to obtaining a minimum axial overall height the casting can form part of the motor casing in that the said casting, at least over a large portion of the axial cross-section of the stator plates forms a rear end surface with which is aligned the rear side of a casing ring facing the rotor, whereby the said ring forms part of the motor casing, whereby the flanged plate engages and is fixed to its side facing the rotor. A protective covering can also be placed over the rear end surface but this need only be very thin because unlike in the rear flanged plate provided in the known motor it does not have to support anything, so that it takes up little space in the axial height.

If an electric motor according to the invention, as is preferably the case, is constructed as an external rotor-type motor with a limited axial overall height, it is recommended that the electromotively active part of the rotor, particularly the rotor plates located between short-circuiting rings fixed to a stamped sheet metal cap, which relative to the front stator winding ends is connected in torsion-resistant manner with the free end of the motor shaft with a narrow air gap and a plastic layer therebetween.

The invention is preferably usable in conjunction with built-in fans. In such a case the external rotor-type motor is arranged as a fan hub on whose rotor are mounted fan blades surrounded by a pipe section which embraces a flow channel, whereby at the rear the said pipe section is fixed to a metallic casing ring with metallic spokes, whereby the said ring is fixed or integral with the flange outer edge.

BRIEF DESCRIPTION OF THE DRAWINGS

Other and further objects of the present invention will be apparent from the following description and claims and are illustrated in the accompanying drawings which by way of illustration show preferred embodiments of the present invention and the principles thereof, and what are now considered to be the best modes contemplated for applying these principles.

Other embodiments of the invention embodying the same or equivalent principles may be used and structural changes may be made as desired by those skilled in the art without departing from the present invention and the scope of the appended claims. In the drawings show:

FIGS. 5 to 7, in the same sectional representation in FIG. 1 in each case represent an embodiment modified relative to that of FIG. 1;

FIG. 8, in cross-sectional representation corresponding to FIG. 1 the stator of a further embodiment ready for casting the casting.

FIGS. 1, 5, 6, 7, 8 are in double size;
FIGS. 3, 4 are in actual size;
FIG. 2 shows linear half the size.

DETAILED DESCRIPTION OF THE PREFERRED EMBODIMENTS

Figure 1:
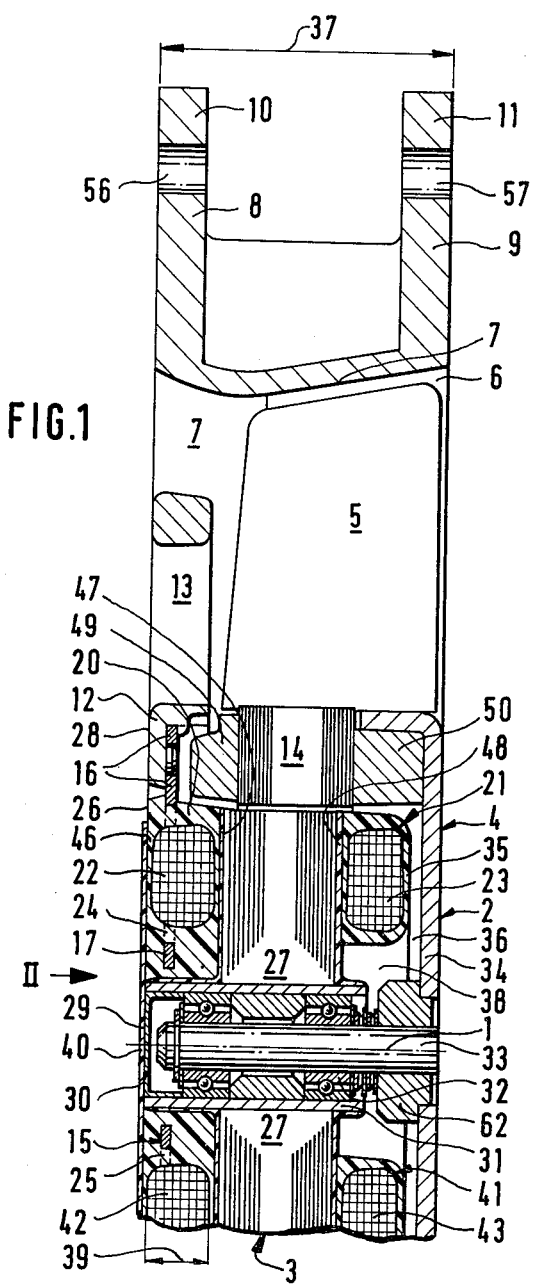
FIG. 1, in broken away form the cross-section of a built-in fan with an external rotor-type motor according to the invention.
Figure 3:
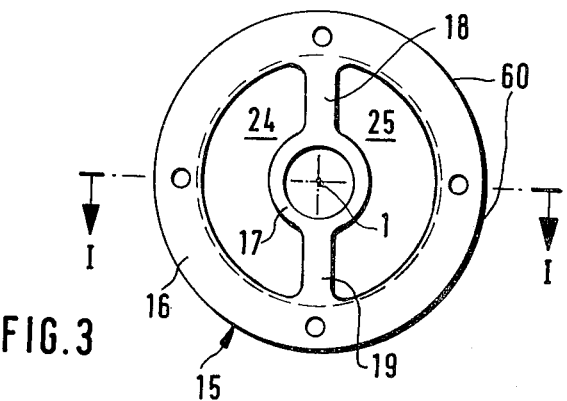
FIG. 3, a view in accordance with arrow II of FIG. 1 of the flanged plate only and more specifically for a bi-polar shaded pole motor.
Figure 2:
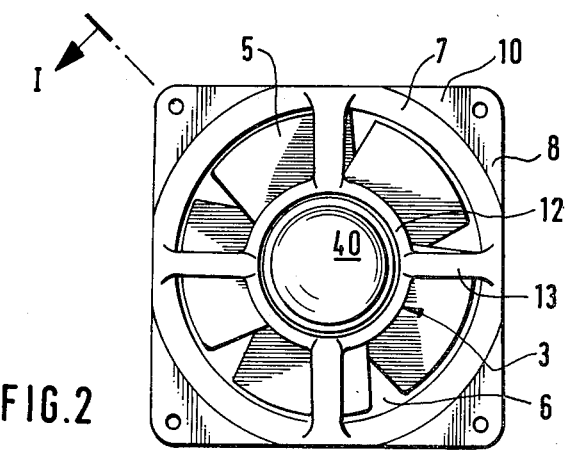
FIG. 2, a view in accordance with arrow II of FIG. 1.

The cross-section of the fan shown in FIGS. 1 and 2 is mirror-symmetrical to the rotor axis 1 shown by dotted lines. The shaded pole external rotor-type motor 2 comprises stator 3 and rotor 4. On the periphery of rotor 4 are provided fan blades 5 which rotate in a flow channel 6 which is surrounded by a pipe section 7 forming part of the casing. The circular pipe section 7, constricted in the manner of a venturi nozzle extends between two square flanges 8, 9 which at their corners 10, 11 have openings 56, 57 for fixing the built-in fan. From the rear flange 8 emanate peripherally distributed radial spokes extending over flow channel 6 up to a casing ring 12. One of these spokes which is not located in the sectional plane of FIG. 1 is designated by the reference numeral 13 in FIG. 1. The casing ring 12 extends peripherally over the axial cross-section of the rotor plates 14 and forms part of the rear covering of the shaded pole motor 2. A flanged plate 15 is fixed by riveting, with metallic contact to casing ring 12 on the side facing the rotor plates 14. Flanged plate 15, which is shown separately in FIG. 3, is fixed to the casing ring 12 and has two rings 16, 17 which are coaxial to axis 1 and which are interconnected by two diametrically opposite spokes 18, 19. The casing which comprises pipe section 7, spokes 13 and casing ring 12 is a die casting made from an aluminium or magnesium alloy and the flanged plate 15 is a stamped part made from sheet iron.

Flanged plate 15 is embedded in a casting 20 so that only the outer portion of ring 16, the flange outer edge 60, projects from the casting. The casting comprises cold workable electrically insulating plastic, e.g., casting resin which is hard from low temperatures up to the extreme operating temperature of the motor, i.e., in the present case a temperature of 120° C. (393° K.).

The plastic is cast round the stator winding of the bi-polar shaded pole motor 2 so that the stator coils 21, 41 are completely embedded in the casting whose rear winding ends are designated by 22, 42 and whose front winding ends are designated by 23, 43. The two rear winding ends 22, 42 project through the gaps 24, 25 left between rings 16 and 17 on the one hand and spokes 18 and 19 on the other. Flanged plate 15 extends axially over about one-fifth of the axial height 39 of the rear winding ends 22, 42, staggered from the end face thereof towards the front side and specifically with an all round spacing from the winding ends 42, 22, which whilst taking account of the necessary manufacturing tolerances is so small that it is just sufficient for the necessary electrical insulation. As the flanged plate 15 is made from metal it is a good heat conductor and also serves to dissipate the heat due to energy losses from stator coils 21, 41 to the metal casing ring 12 and from there via the also metal parts 13, 7, 8 and 9 which are exposed to the air flow resulting from the fan blades. Spokes 18 and 19 of the integrally cast flanged plate extend opposite the centre of the slots of the stator plates 27 not shown in the drawings, i.e., between winding ends 22, 42.

The rear end surface 26 of casting 20 extends over the entire axial cross-section of the stator plates 27 and is aligned with the rear end surface 28 of casing ring 12 and the rear end surface 29 of a cap 30 which covers the rotor bearing 32 located within a bearing tube 31. A thin protective covering 40 is stuck to the rear end surfaces 26, 29 but as this has no supporting function it can be made very thin. This protective covering is not absolutely necessary and can therefore either be omitted or, for example, can be replaced by a coating of varnish. The semi-manufactured product comprising the stator plates 27 and the bearing tube 31 is coated on both sides with a thin electrically conductive plastic layer 47, 48 by means of the vortex sintering process.

A cap 34 forming part of rotor 4 is fitted via a bush 62 onto the free end of rotor shaft 33 protecting from bearing tube 31.

The axial overall height of the built-in fan indicated by double arrow 37 is minimal and is given by the axial overall height of the shaded pole motor 2 which as a result of the invention is minimal. Between the rear end surface 26 and the rear winding ends 22, 42 is provided a narrow plastic layer 46 of casting 20 whose axial thickness is just sufficient to provide the necessary electrical insulation, whilst taking account of the necessary manufacturing tolerances. The front winding ends 23, 42 are also covered by a layer 35 of casting 20 relative to cap 34. The axial height of layer 35 is just sufficient to provide the necessary electrical insulation in conjunction with air gap 36, whilst taking account of the necessary manufacturing tolerances. The axial height of air gap 36 is just sufficient to ensure that the rotor, with the necessary tolerances, does not touch the stator. The rotor short-circuiting rings are designated by the reference numerals 49 and 50.

During manufacture stator coils 21, 41 are re-cast when already mounted on the stator plates 27. The plastic which is flowable during casting then flows into the gaps accessible between the stator coils on the one hand and the stator plates 27 on the other. At the rear the plastic for the casting is allowed to flow up to the bearing tube. However, on the front side the bearing tube is covered by a mould during casting of the casting so that an annular space 38 is left round bearing tube 31.

Figure 4:
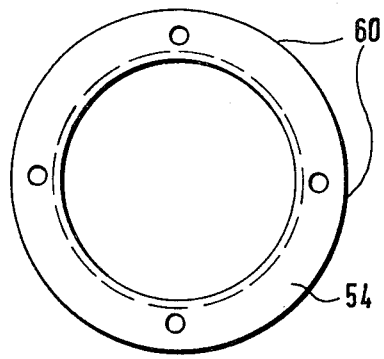
FIG. 4, the flanged plate of an external rotor-type motor with a distributed winding in the view according to FIG. 3.

In the case of an electric motor with distributed winding, e.g., a capacitor motor or a three-phase current motor there is not sufficient space between the winding ends for spokes corresponding to spokes 18 and 19. As shown in FIG. 4, in such a case in place of flanged plate 15 a flanged plate 54 is used which consists of a single ring. This flanged plate 54 surrounds the rear winding ends and corresponds to ring 16 in FIG. 3.

According to FIG. 5, the metallic flanged plate 15 with its inner ring 117 is pressed firmly onto the metallic bearing tube 131 so that there is metallic contact between the flanged plate 115 and the bearing tube 131. To this end plastic layer 147 is formed in such a way that it leaves free the rear portion of bearing tube 131. The metallic connection between flanged plate 115 and bearing tube 131 aids the dissipation of heat from winding end 122 and in particular the dissipation of the losses of stator iron 127 as heat via bearing tube 131 so that the temperature of bearing 132 is lower which increases its service life. Since, as in the embodiments of FIGS. 1 and 2, flanged plate 115 is connected at its outer edge with casing ring 117 accompanied by metallic contact, an electrical connection is additionally formed between the metallic bearing tube 131, the metallic flanged plate 115 and the remaining metal parts of the casing (which in any case must be provided with protective earthing) which is advantageous for the protective insulation. In FIG. 5 the same parts as in FIGS. 1 and 2 are given the same reference numerals plus 100. Apart from the above described differences, the embodiment of FIG. 5 is exactly the same as that of FIGS. 1 and 2.

In the embodiment of FIG. 6 shown in cut-away form, casting 220 does not enclose the entire winding, and in fact the front portions of the front winding ends 223 i.e. those sides of the winding ends directly facing cap 234 are left free. This economises the axial space required for layer 35 in FIG. 1. For insulation purposes cap 234 is backed with a thin insulating foil 252 because in practice this can be made thinner than layer 35 and therefore requires a smaller axial space than the latter. Thus, according to FIG. 6, even when taking account of the necessary width of the air gap 236 the necessary electrical insulation between winding ends 223 and cap 234 can be obtained with a smaller axial space requirement than in FIGS. 1 and 5.

Without layer 35 the heat elimination from the winding end is more intensive. However, then larger leakage paths (spaces) would be necessary on foil 252 but these can easily be adhered to with this construction.

According to FIG. 6, cap 234 is pressed onto the short-circuiting ring 250 and is additionally secured with one or more peripherally distributed beads 267. In this embodiment there is no protective covering corresponding to covering 40. Apart from the above differences the embodiment according to FIG. 6 is the same as in FIGS. 1 and 5. Corresponding parts in FIG. 6 are given the same reference numerals as in FIG. 1 plus 200.

In the case of the embodiment of FIG. 7 the metallic flange ring 315 has a metallic sleeve 361 tightly mounted on bearing tube 331. Plastic layer 347 extends only over stator plates 327 but not over the rear portion of bearing tube 331 so that there is good heat conducting and metallic contact between sleeve 361 and bearing tube 331. In this embodiment there is no protective covering corresponding to covering 40. Apart from these differences the embodiment of FIG. 7 is the same as the embodiments of FIGS. 1, 5 and 6 and corresponding parts are given the same reference numerals as in FIG. 1 plus 300.

FIG. 8 shows a stator embodiment where unlike in the other embodiments its metallic flanged plate 415 is not a separate stamped member but as a further development of the invention is concomitantly die cast onto casing ring 412 and consequently forms a one-piece metal die casting with the spokes 413 and optionally with the entire casing. According to FIG. 8 it is constructed for a shaped pole motor, e.g., with an inner ring 417 which extends up to the bearing tube 431 for metallic contact (force fit) whereby the sleeve-like axial widened portion 461 on the bearing tube is of the width necessary for the heat transfer from the said bearing tube. A collar 464 is advantageously concomitantly cast on outer ring 416 and extends in aligned manner with the stator plate outer surface up to the stator iron 427. Then, without any need for moulds the axial rear casting 420 can be produced by allowing the casting resin to flow in without pressure by rotating in accordance with arrow IX in the direction of arrow 445, whereby the outer casing is concomitantly used as a pot mould. When the plastic is introduced under pressure a flat plate advantageously seals the casting chamber for casting 420 in plane 426.

A sealing ring 465 is optionally provided between collar 464 and stator iron 427.

This is not necessary on the inside and even not when the sleeve 461 is not in contact with the stator iron. Sealing ring 465 can be constructed as a profiled axially spacing member if collar 464 does not bound the stator plates 427. For casting reasons it can sometimes be advantageous to separately produce flanged plate 415 with collar 464 and widened portion 461. The metal die casting 415 can then be riveted at its outer edge 460, e.g., to casing ring 412 in the same way as stamped parts 15, 115, 315. The flanged plate of random type (15 or 415) advantageously has openings 467 for the escape of gases or air during the manufacture of the motor.

The embodiment of FIG. 8 is otherwise the same as the remaining embodiments. Corresponding parts in FIG. 8 are given the same reference numerals as in FIGS. 1, 5, 6 and 7 plus 400.

Obviously the present invention is not limited to the described embodiments and numerous variants are possible thereto without passing beyond the spirit or scope of the invention.

What is claimed is:

1. An electric motor whose rear stator winding ends are embedded in a casting of electrically insulating plastic which is hard at the operating temperature of the motor, which is mounted with a stable metal flanged plate coaxial to the motor axis and fixed to a metallic outer casing member, wherein the flanged plate for the rear winding ends is perforated and has a portion embedded in the casting and an outer edge which is connected with the casing member, said rear stator winding ends extending through the perforated flanged plate with an insulating clearance.

2. An electric motor according to claim 1, wherein the flanged plate comprises two coaxial rings into whose radial gap projects the rear winding ends with said insulating clearance, said rings being interconnected by spokes located in front of the slots between concentrated stator windings.

3. An electric motor according to claim 2, wherein the flanged plate is mounted on a metallic bearing tube which receives the rotor shaft bearing accompanied by a tight seating and metalic contact.

4. An electric motor according to claim 3, wherein the flanged plate has a metallic sleeve which is mounted on the bearing tube.

5. An electric motor according to claim 1, wherein over the entire axial cross-section of the stator plates the casting forms a rear end surface with which is aligned the rear of a casing ring forming part of the motor casing which faces the rotor and whereby the flanged plate engages and is fixed to its side facing the rotor.

6. An electric motor according to claim 1, wherein it is constructed as an external rotor-type motor whose rotor plates located between short-circuiting rings are fixed to a stamped sheet metal cap which relative to the front stator winding ends is connected in torsion-resistant manner with the free end of the motor shaft with a narrow air gap and a plastic layer therebetween.

7. An electric motor according to claim 1, wherein it is constructed as an external rotor-type motor and as the hub of a built-in fan on whose rotor are mounted fan blades surrounded by a pipe section which encloses a flow channel, whereby the rear of the said pipe section is fixed by metal spokes to a metallic casing ring which is secured to the flange outer edge.

8. An electric motor according to claim 1, wherein the flanged plate is a stamped sheet metal member.

9. An electric motor according to claim 1, wherein said metallic outer casing member which includes a casing ring and said flanged plate comprise a one-piece die casting.

10. An electric motor according to claim 9, wherein said metallic outer casing includes a one-piece die casting comprising said casing ring with a coaxial collar which in the mounted state adjoins the stator plates.

11. An electric motor according to claim 1, wherein said casing member includes a ring-like flange portion and said metal flanged plate comprises a separate stamped metal member.

12. An electric motor according to claim 1, wherein the flanged plate is mounted on a metallic bearing tube which receives the rotor shaft bearing accompanied by a tight seating and metallic contact.

13. An electric motor according to claim 12, wherein the flanged plate has a metallic sleeve which is mounted on the bearing tube.

14. An electric motor according to claim 1, wherein the flanged plate has a metallic sleeve which is mounted on a metallic bearing tube for the rotor shaft.

* * * * *